July 14, 1925.
W. B. BRITTIN
1,545,546
HOSE REEL
Filed Sept. 23, 1924
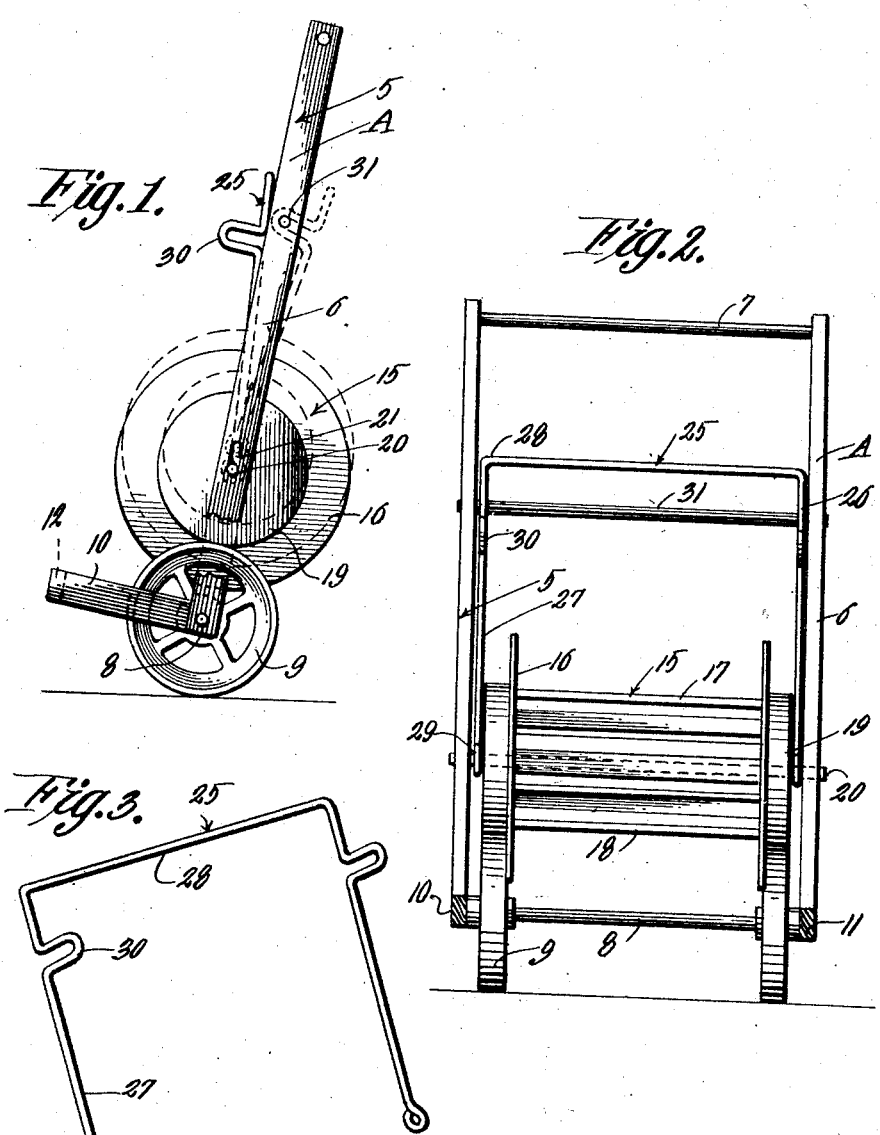
WITNESSES
Inventor
WALTER B. BRITTIN
By Richard Owen
Attorney Patented July 14, 1925.

1,545,546

UNITED STATES PATENT OFFICE.

WALTER B. BRITTIN, OF SPRINGFIELD, OHIO.

HOSE REEL.

Application filed September 23, 1924. Serial No. 739,427.

*To all whom it may concern:*

Be it known that I, WALTER B. BRITTIN, a citizen of the United States, residing at Springfield, in the county of Clark and State of Ohio, have invented certain new and useful Improvements in a Hose Reel, of which the following is a specification.

This invention appertains to reels for receiving garden and like hose, and the primary object of the present invention is the provision of novel means for automatically operating the reel for winding up a hose thereon during the travel of the reel over a lawn or the like.

Another object of the invention is the provision of a novel hose reel embodying a frame, supporting ground wheels for the frame and a drum for receiving the hose, the drum having novel means associated therewith for moving the same into and out of driving connection with the ground wheels, whereby the drum can be rotated to wind up the hose thereon by said ground wheels when so desired.

A further object of the invention is to provide an improved hose reel of the above character, which is durable and efficient in use, one that is simple and easy to manufacture and one which can be placed upon the market at a small cost.

With these and other objects in view, the invention consists in the novel construction, arrangement and formation of parts, as will be hereinafter more specifically described, claimed and illustrated in the accompanying drawing, in which drawing:

Figure 1 is a side elevation of the improved reel, showing the drum for receiving the hose in its operative position relative to the ground wheels in full lines, and in its inoperative non-driving position in dotted line.

Figure 2 is a front elevation of the improved hose reel showing parts of the frame in section, and Figure 3 is a detail perspective view of the raising and lowering bracket for the drum.

Referring to the drawing in detail, wherein similar reference characters designate corresponding parts throughout the several views, the letter A generally indicates the improved hose reel which comprises a frame 5, a hose reel or drum 15 and the hose or drum raising and lowering means 25.

The frame 5 consists of a pair of spaced parallel longitudinally extending side bars 6 connected at their upper ends by a cross bar 7 which constitutes a handle for the reel. The lower ends of the side bars 6 support a suitable axle 8 on which are rotatably mounted the ground wheels 9. An auxiliary frame 10 projects forwardly and laterally from the main frame 5 and this auxiliary frame also embodies relatively short side bars 11 and a front cross bar 12.

The reel or drum 15 includes a pair of spaced guide disks 16 which are connected by a hub 17. This hub 17 is preferably formed from a plurality of slats 18. Friction drive wheels 19 are secured to the outer faces of the disks 16 and these friction drive wheels 19 are adapted to engage the ground wheels 9, for a purpose which will be hereinafter more fully described. As shown, the reel per se or drum 15 is rotatably mounted upon a supporting axle 20 which is slidably mounted in longitudinally extending slots 21 formed in the side bars 6 of the frame 5.

The means 25 for raising and lowering the drum 15 so as to bring the drive wheels 19 into and out of engagement with the ground wheels 9 consist of a substantially U-shaped yoke 26 including side bars 27 and a connecting end bar 28. The lower terminals of the arms 27 are provided with terminal eyes 29 for receiving the terminals of the drum.

The side arms 25 of the U-shaped yoke 26 adjacent to the connecting bar 28 are provided with laterally extending bite or U-shaped portions 30 and these portions 30 are adapted to receive a supporting rod 31 when the yoke is in its raised position. This supporting rod 31 is carried by the side bars 6 of the frame 5 and serves as means for supporting the said yoke in a raised position and the drum drive wheels 19 from out of engagement with the ground wheels 9.

In use of the improved hose reel, when it is desired to wind a hose up thereon, the hose is first straightened out, after which the nozzle thereof is inserted between the slats 18 of the hub 17. The yoke 27 can then be slightly oscillated so as to move the bite portions 30 out of engagement with the rod 31, which will permit the dropping of the yoke 26 and the reel 15 and the drive wheels 19 into engagement with the ground wheels 9. The whole reel A can then be rolled over the ground toward the hose, and during movement of the reel over the ground, the drum 15 will be rotated from the ground wheels and thus automatically wind up the hose thereon. After the hose has been completely wound up on the drum, the connecting bar 28 can be grasped by the user and the drum lifted up so as to move the drive wheels 19 from out of engagement with the ground wheels 9 and the bite portions 30 moved into engagement with the supporting cross bar 31. The reel A can now be moved over the ground without rotation of the drum 15.

Changes in details may be made without departing from the spirit or the scope of this invention.

What I claim as new is:

A hose reel comprising a frame, rotatable ground wheels carried by the frame, a hose drum rotatably and slidably carried by the frame, a U-shaped yoke including side arms and a connecting cross bar, terminal eyes formed on the lower ends of the arms for rotatably receiving the supporting shaft of the drum, whereby the said drum can be raised and lowered by the yoke, drive wheels secured to the opposite ends of the drum for engaging said rotatable ground wheels when the drum is in its lowered position, a cross rod extending across and bracing the frame, and laterally disposed bight portions formed on the side arcs of the U-shaped yoke for engaging said cross bar to hold the yoke and reel in a raised position.

In testimony whereof I affix my signature in presence of two witnesses.

WALTER B. BRITTIN.

Witnesses:
HARRY A. BRITTIN,
HARRY BYERLY.